United States Patent [19]
Eames et al.

[11] Patent Number: 6,002,795
[45] Date of Patent: *Dec. 14, 1999

[54] METHOD AND APPARATUS FOR TRANSFORMING A SOURCE IMAGE TO AN OUTPUT IMAGE

[75] Inventors: Andrew Eames, Mountain View, Calif.; James K. Schwarz, Jr., Boulder, Colo.

[73] Assignee: Electronics for Imaging, Inc., Foster City, Calif.

[ * ] Notice: This patent is subject to a terminal disclaimer.

[21] Appl. No.: 08/878,813

[22] Filed: Jun. 19, 1997

Related U.S. Application Data

[63] Continuation of application No. 08/424,242, Apr. 17, 1995, Pat. No. 5,666,436, which is a continuation of application No. 08/136,975, Oct. 14, 1993, abandoned.

[51] Int. Cl.$^6$ ........................................ G06K 9/00
[52] U.S. Cl. ........................... 382/167; 358/523; 358/525
[58] Field of Search .................................. 352/162, 167; 358/515, 518, 523, 525; 345/150, 153, 154, 155; 395/131

[56] References Cited

U.S. PATENT DOCUMENTS

| | | | |
|---|---|---|---|
| 4,477,833 | 10/1984 | Clark et al. | 358/525 |
| 5,068,644 | 11/1991 | Batson et al. | 345/155 |
| 5,107,332 | 4/1992 | Chan | 358/518 |
| 5,130,701 | 7/1992 | White et al. | 345/199 |
| 5,343,311 | 8/1994 | Morag et al. | 358/518 |
| 5,666,436 | 9/1997 | Eames | 382/167 |

OTHER PUBLICATIONS

Gounet. "Handbook of Algorithums and Data Structures." Addison–Wesley Publishing Company, pp. 37–69, 1984.

*Primary Examiner*—Jon Chang
*Attorney, Agent, or Firm*—Michael A. Glenn

[57] ABSTRACT

The present invention is a method and apparatus for computing color transformations of source images. It performs color transformations using a lookup table and a hashing block for referencing entries in the lookup table. The index generated by the hashing block is dependent on a first color value. A color encoding block is coupled to the lookup table for generating an encoded color value dependent on the first color value. The index produced by the hashing block is further dependent upon response characteristics of the human eye. The hashing block generates indexes referencing widely separated entries in the plurality of entries of the lookup table when first color values have small differences in value. A comparing block is coupled to the lookup table and the color encoding block for comparing the entry of the lookup table and the encoded color value to determine a match. A color calculation block is coupled to the lookup table for generating a second color value dependent on the first color value. The color calculation block generates the second color value when a match does not occur. The second color value is also stored in the entry of the lookup table. When a match does occur, the lookup table outputs the second color value instead of calculating a new second color value. In the preferred embodiment of the present invention, the hashing block comprises a plurality of lookup tables and a logic block coupled to the plurality of lookup tables for generating the index.

8 Claims, 5 Drawing Sheets

METHOD AND APPARATUS FOR TRANSFORMING A SOURCE IMAGE TO AN OUTPUT IMAGE

This is a continuation of application Ser. No. 08/424,242 filed on Apr. 17, 1995 now U.S. Pat. No. 5,666,432, which is a continuation of Ser. No. 08/136,975 filed Oct. 14, 1993, now abandoned.

BACKGROUND OF THE INVENTION

1. Field of the Invention

The present invention relates to the field of performing transformations of the color information in an image.

2. Background Art

The process of transforming image color information from one color space to another is an intensely time consuming operation. A color space is a three-dimensional space in which each point corresponds to a color, including both luminance and chrominance aspects. A color transformation of a source image is performed by converting each picture element of a source image from a first color space to a second color space. Such transformations include: converting appearance values (e.g., RGB and CIELAB) to colorant or ink values (e.g., CMYK); converting colorant values to appearance values; converting from one appearance value representation to another appearance value representation; and, converting from one set of colorants to another set of colorants. The foregoing transformations are provided by means of example.

As computing power increases and as computer users become more sophisticated, the use of color images in computer systems and computer based publishing systems is becoming increasingly widespread. The use of color images is not limited to professionals using high-end computer systems. Instead, it is quickly becoming a standard feature of personal computers as used by all levels of computer users.

Providing efficient and accurate color printing has numerous difficulties. One difficulty is that the process of converting color information from appearance value such as RGB and CIELAB to colorant or ink values such as CMYK is a computationally intensive process. Performing such conversion is called color separation. Accordingly, there is difficulty with providing efficient color printing. This is due to the considerable computing power required for color separation to print the large amount of information contained in an electronic color image.

Color photographic prints, color photographic transparencies and color displays (e.g., color CRTs) are capable of rendering a different range of colors than can be rendered by color printers. This is because color printers are limited by the color inks and paper used in them. That is, the color gamut, defined as the range of colors that can be accurately rendered by a device, is different for different types of devices. Gamut napping is the process of converting color information such that out-of-gamut colors are converted to colors in the gamut of a particular device of interest. Another difficulty providing efficient and accurate color printing is that gamut mapping is a computational intense process. Accordingly, there is difficulty with providing efficient color gamut mapping, and considerable computing power is required to gamut-map the large amount of information contained in an electronic color image.

Different printers render color differently and use colorants or inks that behave differently. Thus, printing an electronic image on a printer using colorants values determined for another printer involves colorant-to-colorant conversion. Colorant-to-colorant conversion is a computationally intensive task. For example, such a task is performed when simulating the output of a printer on another printer. This process is commonly called proofing. For example, it is frequently used to simulate the results of offset printing on a printer attached to a computer. The computational complexity of colorant-to-colorant conversion makes efficient proofing difficult.

Often, the appearance of an image consisting of colorant values aimed at a particular printer are simulated on a computer display. Because displays typically use RGB values, such a task requires colorant-to-appearance value conversion. Colorant-to-appearance value conversion is also required to input a previously separated image to a color image editor such as the Cachet™ color editor for color correction or other aesthetic changes. Cachet™ is a product of the assignees of this invention but not the subject of the present invention. A difficulty is that colorant-to-appearance value conversion is a computationally intense task.

Color management systems perform all the color conversions described above. A problem with prior art color management systems is that the conversions are computationally intense and thus require much time to be performed for images containing a large amount of color data.

A typical electronic image comprises picture elements, also called pixels, that are arranged into rows and columns. These pixels together make up the image as stored in digital form and as displayed on a visual display. Each pixel of the electronic image contains, among other information, the color information for that particular pixel.

The color information for the pixels in an electronic image can be defined in a number of different ways. If the electronic image is to be displayed on a typical raster scanned display, or if the electronic image is obtained from a color scanner, it is common in the art to use an RGB representation scheme. In the RGB scheme, the color information of each pixel is defined as having some quantity of each of the additive primary colors red (R), green (G) and blue (B). In the case of a displayed image, if the display uses a cathode ray tube (CRT) then the RGB values are converted to voltages that drive the CRT guns. Thus, the RGB values represent the intensities of the red, green, and blue guns, respectively, of the CRT. In the case of scanned images, scanners measure the color at each pixel of an original print or transparency. Such scanners typically output RGB values.

Although the RGB representation scheme is common, other representation schemes may be used. As is well known in the art, three numbers are needed to represent color information at each pixel. The different means of representing color information use a different set of three numbers to represent the color. Because three-dimensional space can be defined by coordinate systems having three variables, the different means for describing color define different color spaces. Each color can be considered a point in color space where the particular variables used to define color indicate the coordinate system of the three-dimensional space. A color space or color solid is defined in Webster's Third New International Dictionary, Unabridged, Copyright 1986, as a, "three-dimensional space each point of which represents a color."

Appearance values in appearance variable color spaces are defined as values produced by any reversible transformation of RGB. Appearance values include R, G, and B values. Other representation schemes that use appearance variable color spaces include the HSB scheme, the CMY scheme, and colorimetric schemes. In the HSB scheme, the color information of each pixel is defined in quantities of hue, saturation, and brightness. The HSB appearance variables are hue, saturation and brightness or brilliance, wherein the color each pixel is represented by a point in the HSB color space. In the CMY scheme, the color information of each pixel is defined by the amount of the three subtractive primiaries CMY for (C)yan, (M)agenta and (Y)ellow. Cyan is green added with blue, magenta is red added with blue, and yellow is red added with green. These appearance variable CMY values are different from the colorants. The colorants are practical inks and dyes, and behave differently from ideal subtractive primaries. Colorimetric schemes for specifying color include use of the mathematical spaces CIELAB, CIELUV, CIEXYZ and xyz. The acronym CIE denotes the Commission Internationale de l'Eclairage, while the following three letters refer to the three coordinates used to define the color information. Colorimetric schemes are typically used in color management systems.

In a digital computer system, to represent the color information in each pixel of an electronic image, it is necessary to use a finite integer usually represented by a finite number of bits. For example, it is common in a digital computer system using an RGB scheme to use eight bits for each of the three colors red, green and blue for each pixel. Using eight bits for each of three colors for each pixel results in a twenty-four bits per pixel scheme, which can result in $2^{24}$ (almost 17 million) different colors per pixel.

In addition to the technology of electronic representations of color images, another technology, that of the printing of color images is briefly described below. Although color images may be electronically represented with any of the above-mentioned schemes, they are not printed in the same way. Printing devices typically apply three or four colorants such as cyan, magenta, yellow and black inks.

Colorants are defined as inks or dyes used for printing. Both for printing reflective prints and transparencies, the density of colorants is approximately proportional to the quantity of ink laid down. The acronym CMYK refers to the densities of cyan, magenta, yellow, and black ink typically used in printing reflective prints. Each pixel's color information is defined as having some quantity of each of the colors cyan, magenta and yellow, and the quantity of black. Transparencies are typically printed with only cyan, magenta and yellow. Because inks and dyes combine in a complicated way, CMY colorants behave differently from and only approximately like the true subtractive primaries cyan magenta and yellow. CMY is subsequently used herein to denote colorant values.

The conversion of color information from appearance values such as RGB to colorant or ink values such as cyan, magenta, yellow, and possibly black (CMYK) is a complicated process. As stated previously, such conversion is known in the art as color separation. Color separation is frequently used in the process of printing scanned images and synthetically generated color images. This is done because scanned and synthetic images are typically generated in RGB, while printing devices apply three or four colorants such as CMY or CMYK.

Color separation is a computationally complex and time consuming task, even with special purpose hardware. Because models of the conversion to colorants are not sufficiently accurate, most methods known in the art for performing color separation on digital hardware such as computers and special purpose separation hardware use as the key step an empirical table of color separations together with a multidimensional interpolation method to deal with values not in the empirical table of color separations. Such a prior art system is disclosed in U.S. Pat. No. 4,500,919 entitled "Color Reproduction System" that was issued to William F. Schreiber on Feb. 19, 1985. Although approximate interpolation using linear techniques is used typically, such table lookup and interpolation techniques are relatively slow. Furthermore, transformation from RGB to CMYK using such prior art techniques often requires additional steps of non-linear transformations of the RGB variables. This is followed by transformation of these new variables to an intermediate color space such as CIELAB, followed by transformation from the intermediate color space to CMYK. Therefore, there exists a need for faster color separation methods and apparatuses.

A technique for speeding up color separation might be to build a lookup table of precalculated separations. Each precalculation can be done by any known method including the table lookup and interpolation technique. Thus, a table can be built that has one entry for every RGB value encountered in the image. Each entry in the table has the corresponding colorant (typically CMYK) values. Since 24-bits are typically used to define RGB, the table typically has $2^{24}$ entries. When one byte is used for each of C, M, Y and K, the table thus requires 64 MB of storage. However, this amount of storage is not practical for most applications.

A prior art method for speeding up color separation is disclosed in U.S. Pat. No. 4,668,980 entitled "Video Retouching Systems" that was issued to Peter W. Stansfield, et al. on May 26, 1987. It speeds up color separation by using the observation that, in typical electronic images, many pixels have identical color values. Thus, increased processing speed is obtained by taking advantage of previously calculated separations. The prior art technique builds a table that has one entry for every RGB value encountered in the image. Each entry in the table has the corresponding CMYK values. Given the RGB value of a particular pixel, a check is made to determine if the value is stored in the table, thereby indicating such a color value has already been encountered in the image. When the check returns true, the needed separation is already available. Otherwise, the required CMYK values are calculated using conventional means, and are inserted as a new entry in the table. Since typically, 24-bits are used to define RGB, the table potentially has $2^{24}$ entries, thus may require more than 64 MB of storage (given 8-bits for each of C, M, Y and K), which is not practical for most applications.

The other conversions, appearance value-to-appearance value, colorant-to-appearance value, and colorant-to-colorant, are similarly computationally intense. These conversions likewise are typically performed using lookup in empirical tables and multidimensional interpolation. Some of the appearance value-to-appearance value calculations are carried out by computation, but because of the large number of pixels in a typical electronic image, the conversion process is a computationally complex and time consuming task, even with special purpose hardware.

It is an object of this invention to provide a method and apparatus for rapidly performing color-space conversions including appearance value-to-colorant value conversion such as color separation, appearance value-to-appearance value conversion, colorant value-to-appearance value conversion, and colorant value-to-colorant value conversion.

SUMMARY OF THE PRESENT INVENTION

The present invention is a method and apparatus for computing color transformations of source images. The present invention performs color transformations using a lookup table comprising a plurality of entries and a hashing block coupled to the lookup table for referencing its entries. The index generated by the hashing block is dependent on a first color value. A color encoding block is coupled to the lookup table for generating an encoded appearance value dependent on the first color value. A comparing block is coupled to the lookup table and the color encoding block for comparing the entry of the lookup table and the encoded color value to determine a match. A color calculation block is coupled to the lookup table for generating a second color value dependent on the first color value. The color calculation block generates the second color value when a match does not occur. The second color value is also stored in the entry of the lookup table. When a match does occur, the lookup table outputs the second color value instead of calculating a new second color value.

In the present invention, hashing is performed so that visually similar colors ("close" in some color space when the human visual system is taken into account) are hashed to addresses in the LUT that are far away. This is done to minimize collisions. When a plurality of pixels in an image are transformed, the image is typically read out ("scanned") in a sequence such that pixels that are geometrically close in the image are encountered close to each other in the sequence. In typical images, pixels that are geometrically close to each other do not vary much in color. Thus, the hashing scheme of the present invention minimizes collisions. In this manner, color transformations of typical images are performed faster than with prior art LUT techniques. The present invention rapidly calculates hash values using LUT's.

The first color value comprises P bits and the index comprises N bits, where N2P. The encoded color value, in turn, comprises P–N bits for representing the first color value. The index produced by the hashing block is dependent upon response characteristics of the human eye. Further, the hashing block generates indexes referencing widely separated entries in the plurality of entries of the lookup table when first color values have small differences in value. The plurality of entries of the lookup table are initialized to a first value. The hashing block comprises a plurality of lookup tables for storing transformed values of a first plurality of color components, respectively. The first plurality of color components are dependent upon a second plurality of color components of the input color value. The hashing block also includes a logic block coupled to the plurality of lookup tables for generating the index using the first plurality of color components. Thus, the present invention transforms a first color value that is a point in appearance variable color space such as RGB into colorant values such as CMYK. The present invention also thus transforms a first color value that is a point in appearance variable color space such as RGB into a point in another color space such as CIELAB. The present invention also thus transforms a first color value defined by colorant values such as CMYK into a point in an appearance value color space such as RGB. The present invention also thus transforms a first color value defined by colorant values such as CMYK into a point into a color value defined by different colorant values.

In one preferred embodiment of the present invention, that for conversion from appearance values to colorants, first and second signals dependent upon an input RGB signal are computed. The first signal references entries in a lookup table comprising a plurality of entries that is stored in memory. The contents of the entry in the lookup table referenced by the first signal is compared with the second signal. When a match occurs, a CMYK signal is obtained from the entry and provided as an output signal. When a match does not occur, the CMYK signal is computed dependent on the RGB signal. The second signal and the CMYK signal are stored in the LUT entry, and the CMYK signal is provided as the output signal.

The input RGB signal comprises P bits for storing the RGB value. The first signal comprises N bits for referencing the LUT containing $2^N$ entries. The second signal comprises P-N bits for encoding the RGB signal. The first signal is dependent upon response characteristics of the human eye. The main LUT is allocated and initialized in main memory. The input RGB signal is processed by allocating second and third LUTs of $2^{P/3}$ entries. Modified color values B' and R' signals, dependent upon B and R components, respectively, of the input RGB signal, are stored in the second and third tables, and used for calculating the first signal, respectively.

DETAILED DESCRIPTION OF THE PRESENT INVENTION

Figure 1:
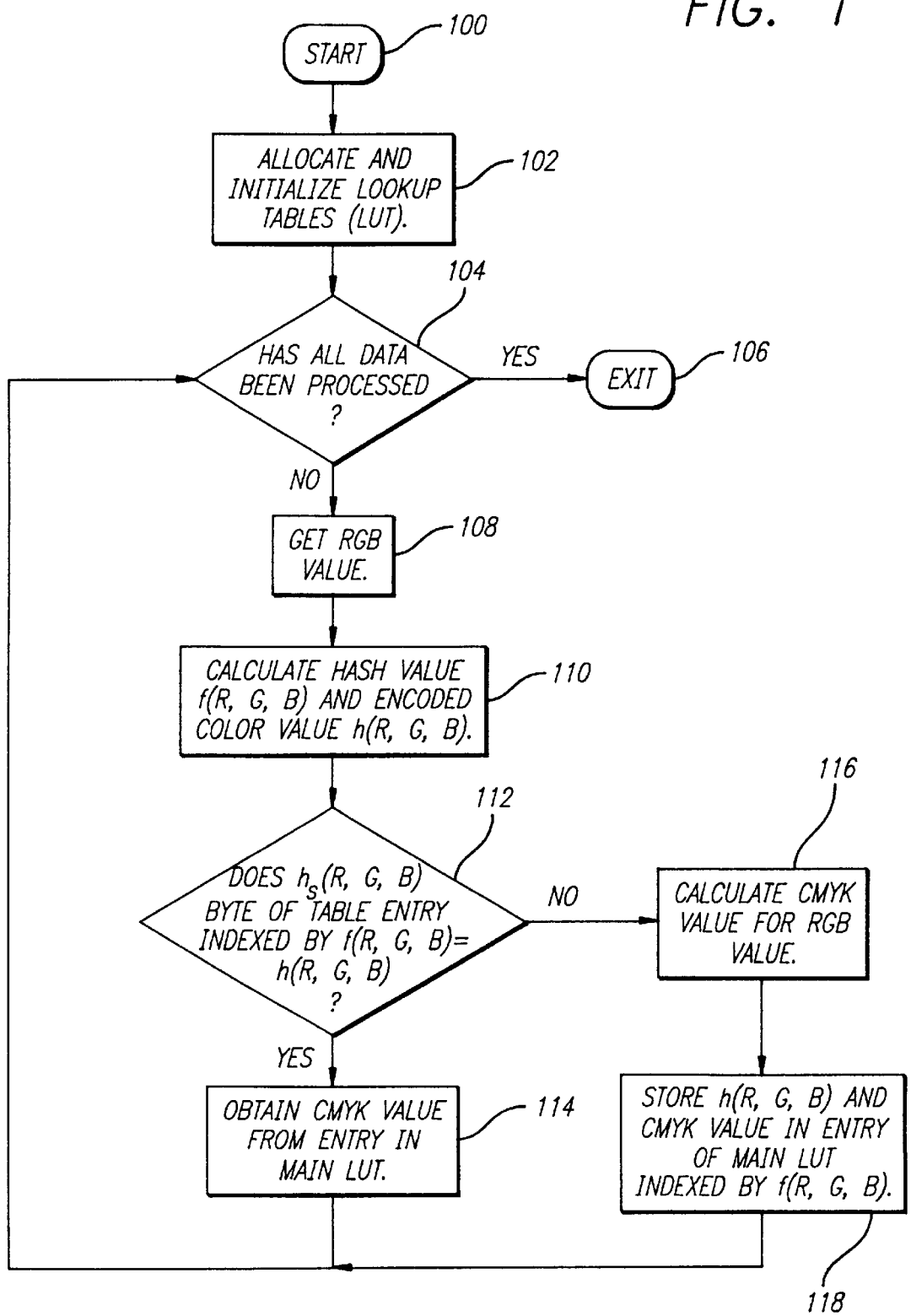
FIG. 1 is a flow diagram illustrating the color transformation method of the present invention.

A method for computing color transformations of source images is described. In the following description, numerous specific details, such as number and nature of link arrays, etc., are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

Overview of Present Invention

The present invention provides an improved method for calculating color transformations, including color separations and transformations from colorants to appearance variables. This is accomplished by using a hashing technique together with a lookup table, the use of which considerable reduces the amount of computation required to generate color transformations.

A source image is processed as a bitmap comprised of pixels. Generally, a pixel (or picture element) is a small, rectangular area identified by horizontal and vertical coordinates (e.g., X-Y) of one corner of the pixel. A bitmap, in turn, is a matrix of such pixels. Thus, a source image can be represented by a matrix of pixels. Examples of bitmap resolutions include 512×512, 640×480, 1024×728, 1280× 1024, etc. Each pixel of a source image has an associated color or grayscale. In the following discussion, color is specified in appearance variable in RGB color space and by colorants using CMYK. Primary color components of red, green, and blue can be added together to generate a desired color. Each color component of R, G, and B is quantized to a known number of bits. In the present invention, the color value of a pixel in appearance variable color space is represented by P=24 bits where each color component of R, G, and B is represented by P/3=8 bits, and in colorant variable by 32 bits, consisting of 8 bits for each of C, M, Y and K. The foregoing is provided by way of example. The source image is processed pixel by pixel. Each pixel is hereinafter referred to more simply as an RGB value. It should be apparent to a person skilled in the art that the present invention can be practiced utilizing other well-known color spaces, colorants, bitmap resolutions, and number of bits per pixel for representing a color value. Further, while the example of the preferred embodiment is that of color separation, the invention can be practiced for other color transformations. These transformations include transformations from colorant values to different colorant values, from colorant values to appearance variable color space, and from one appearance variable color space to a different appearance variable color space.

The method and apparatus of the present invention speeds up color separation using the observation that in typical electronic images, a plurality of pixels have identical color values. Thus, increased processing speed is obtained by taking advantage of previously calculated separations. Unlike prior art techniques, the method and apparatus of the present invention is advantageous for many applications since it has a relatively small table of precalculated values.

Conversion of RGB to CMYK

For conversion from RGB to CMYK, the present invention begins processing by building a main LUT indexed by an N bit address, where N is less than the number P of bits for storing an RGB value (e.g., P=24 bits). The LUT has $2^N$ addressable entries. RGB values are used to address the entries of the LUT. Therefore, $2^{(P-N)}$ RGB values are mapped into each entry of the LUT. An entry in the LUT contains information stored as follows: $h_S(R,G,B)$CMYK. $h_S$ (R,G,B) is a coded representation of the RGB value that mapped into the entry of the LUT. The coded representation $h_S(R,G,B)$ also contains a flag bit x indicating whether the entry has been used or not. CMYK are the corresponding color separations calculated for the RGB value. As described below, $h_S(R,G,B)$ is stored as a byte comprising 8 bits, where x is a single bit and RGB is encoded into 7 bits. The actual RGB is determined from the address f(R,G,B) of the location in the table, and seven bits of $h_S$ (R,G,B) as described below. The address f(R,G,B) is determined as a hashing function. In an alternate embodiment, the full 24 bits of RGB and a flag may be used in each table entry instead of $h_S(R,G,B)$, the encoded RGB, three bytes for RGB plus some memory for the flag, rather than one byte in the preferred embodiment for RGB to CMYK conversion. In the preferred embodiment, initially, the flag x of each entry in the LUT is set to 1 indicating that it has not been used. CMYK is stored in 4 bytes, where each color separation C, M, Y, and K of the CMYK value comprises 8 bits. Thus, the total memory space used by the LUT is equal to $5 \times 2^N$ bytes. The LUT is used to maintain previously calculated CMYK values.

The present invention maps RGB values into LUT addresses so that RGB values that are close to each other are hashed to addresses in the LUT that are far apart. That is, RGB values map to hash values f(R,G,B) that are widely dispersed. This is done to reduce collisions in the LUT for pixels in the image having color values in the source image that change slowly. This typically speeds up the overall process of transforming the whole image. For example, to transform a plurality of pixels in an image, the image is typically reads out ("scans") in a sequence such that pixels that are geometrically close in the image are encountered close to each other in the sequence. In typical images of natural scenes, pixels in similar geometrically close regions do not vary much in color from each other. Thus, the number of collisions is significantly reduced when color separation is performed on such images according to the present invention. The present invention ensures that previously calculated CMYK values of localized RGB values are more likely to be maintained in the LUT.

The mapping of RGB values used in the preferred embodiment of the present invention is dependent upon known response characteristics of the human eye. The human eye is most responsive to green and is least sensitive to blue. As shown below in Equation (1), the bit order of components B and R are reversed, thereby making the lower order bits more significant than the higher order bits. The reversed components B' and R' are then shifted left by (N−8) and (N−7)/2, respectively. This gives small changes in G greater significance than R, and R in turn is given more weight than component B. For this reason, (N−7)/2 bits of lower order G component quantization bits are kept in the hash value. For the case of N=17, five quantization bits for green are maintained.

The hashing function f(R,G,B) is chosen not only so that colors visually close have dispersed LUT addresses, but also so that this hashing function may be rapidly computed.

In the preferred embodiment for conversion from RGB to CMYK, each P-bit RGB value is mapped, or hashed, into an N-bit address of the LUT according to a function f(R,G,B) as follows:

$$f(R,G,B)=(\text{B'}<<(N-8)\oplus(\text{R'}<<(N-7)/2)\oplus G). \tag{1}$$

The operator "$\oplus$" represents an exclusive-OR (XOR) operation, and "<<" is a shift left operation so that, for example, "<<5" means shift left by 5 places. The prime (') operator reverses bit order so that transformed color components B' and R' are components B and R, respectively, of the RGB value with the order of bits reversed. For example, if $R=R_7R_6R_5R_4R_3R_2R_1R_0,$ then $R'=R_0R_1R_2R_3R_4R_5R_6R_7.$ The RGB value is encoded in an (P−N) bit value according to a (P−N+1) bit function h(R,G,B) as follows:

$$h(R,G,B)=R \text{ AND Flag\_mask}, \tag{2}$$

where $$\text{Flag\_mask} = \text{NOT}\{1 \ll (16 - N + [(N-7)/2)]\} \tag{3}$$

$$= 11101111 \text{ when } N = 17.$$

The operator "AND" represents an AND operation, NOT is the complement operation, and 1 is binary 1, that is 0 . . . 01. The part of h(R,G,B) that comes from encoding the RGB value comprises P−N bits (e.g., P−N=7 as given above). Additionally, h(R,G,B) has one extra flag bit, set to 0, for a total of P−N+1 bits. The encoded RGB value h(R,G,B) and the hash value f(R,G,B) are used to uniquely specify the input RGB value of P bits. Thus, full accuracy is given by encoded RGB value h(R,G,B) for a given hash value f(R, G,B). Table 1 illustrates the generation of a hash value f(R,G,B) and an encoded RGB value h(R,G,B) according to Equations (1) and (2).

TABLE 1

$$B = B_7\ B_6\ B_5\ B_4\ B_3\ B_2\ B_1\ B_0 \rightarrow B' = B_0\ B_1\ B_2\ B_3\ B_4\ B_5\ B_6\ B_7$$
$$R = R_7\ R_6\ R_5\ R_4\ R_3\ R_2\ R_1\ R_0 \rightarrow R' = R_0\ R_1\ R_2\ R_3\ R_4\ R_5\ R_6\ R_7$$
$$G = G_7\ G_6\ G_5\ G_4\ G_3\ G_2\ G_1\ G_0$$

$$
\begin{array}{rl}
 & G_7\ G_6\ G_5\ G_4\ G_3\ G_2\ G_1\ G_0 \\
\oplus & R_4 \\
\oplus B_0\ B_1\ B_2\ B_3 & B_4\ B_5\ B_6\ B_7 \\
f(R,G,B) = f_{16}\ f_{15}\ f_{14}\ f_{13} & f_{12}\ f_{11}\ f_{10}\ f_9\ f_8\ f_7\ f_6\ f_5\ f_4\ f_3\ f_2\ f_1\ f_0 \\
R_7\ R_6\ R_5 & R_4\ R_3\ R_2\ R_1\ R_0 \\
\text{AND}\quad 1\ \ 1\ \ 1 & 0\ \ 1\ \ 1\ \ 1\ \ 1 \\
\end{array}
$$

$$h(R,G,B) = h_7\ h_6\ h_5\ h_4\ h_3\ h_2\ h_1\ h_0 \text{ where } h_4 = x = 0$$

Table 1 is discussed with reference to Equations (1) and (2). The R, G, and B components of an RGB value are illustrated, each comprising 8 bits ($B_7 \ldots B_0$, $G_7 \ldots G_0$, and $R_7 \ldots R_0$), respectively. The order of bits for each component B, R, and G is from left to right from a most significant bit (MSB) to a lowest significant bit (LSB). Reversed color components B' and R' are generated by reversing the bit order (LSB to MSB) of color components B and R, respectively. Using Equation (1), a hash value f(R,G,B) is generated by appropriately shifting the reversed color components B' and R', and then exclusive-ORing the two values with the G component.

As indicated in Table 1, the hash value f(R,G,B) is seventeen bits long (N=17). Thus, seven bits of resolution of the original 24 bit RGB value are not retained by the hash value. In order to maintain full P bit accuracy for the RGB value, P-N bits are stored as the encoded RGB value part of h(R,G,B). In the preferred embodiment for RGB to CMYK conversion, the three most significant bits and the four least significant bits of the red component R are used to produce the encoded RGB value part of h(R,G,B). Using these bits (indicated with boxes in Table 1), the original 24 bit RGB value can be determined using the hash value f(R,G,B). For example, in Table 1, the four least significant bits $B_3$, $B_2$, $B_1$, and $B_0$ of blue component B, the fifth significant bit $R_4$ of red component R, and the five least significant bits $G_4$, $G_3$, $G_2$, $G_1$ and $G_0$ of green component G are contained in hash value f(R,G,B). The remaining seven bits of f(R,G,B) are either a bit from the red component exclusive-ORed with a green component bit, or a bit from the red component exclusive-ORed with a blue bit. Since the encoded RGB value h(R,G,B) contains the above mentioned red component bits that are exclusive-ORed, the missing B and G bits in f(R,G,B) can be obtained. This is done by using the principle that, given bit-variables A, C and Z, if $A \oplus Z = C$, $Z = \text{NOT}(A \oplus C)$. For example, bit $f_{12}$ of f(R,G,B) is determined using Equation 1 (or Table 1):

$$f_{12}=R_0 \oplus B_4. \qquad (4)$$

$R_0$ is $h_0$, the least significant bit of h(R,G,B), so that $$B_4 = \text{NOT}(h_0 \oplus f_{12}). \qquad (5)$$

Thus, $R_0$ and $B_4$ are obtained from f(R,G,B) using h(R,G,B). Similarly, the other missing bits of the original 24 bit RGB value can be obtained. Thus, the full RGB value may be obtained from h(R,G,B) given f(R,G,B). The LUT only needs to store h(R,G,B) in each location as $h_S$(R,G,B). Since that location can only be reached using hash function f(R,G,B), the full RGB value corresponding to any location is known. In practice, processing starts with knowledge of RGB for any pixel since it starts with the RGB value for each pixel.

Alternate hashing functions f(R,G,B) are also possible. In an alternate embodiment, the function $$f(R,B,G)=(B'<<(N-8)) \oplus (R'<<(N-7)/2) \oplus G) \qquad (6)$$

is used in place of the function of Equation 1. In yet another embodiment, for the case where N=17, the hashing function $$f(R,G,B)=(B_{0-5}<<12) \oplus \approx G_{0-4}, \qquad (7)$$

is used, where $$B_{0-5}=(B' \text{ AND Mask}_B) \text{ with Mask}_B=0011111, \qquad (8)$$

$$R_{0-5}=(R' \text{ AND Mask}_R) \text{ with Mask}_R=0011111, \text{ and} \qquad (9)$$

$$G_{0-4}=(G' \text{ AND Mask}_R) \text{ with Mask}_R=011111. \qquad (10)$$

Other hashing functions having the property that small changes in an appearance variable lead to different addresses in the LUT may be utilized without departing from the scope of the present invention.

In the preferred embodiment for RGB to CMYK conversion, the fourth most significant bit $h_4$ of the byte-long value h(R,G,B) is used as a flag x to indicate whether or not a particular entry in the LUT has been used. As stated previously, $h_S$(R,G,B) denotes the part of each LUT entry for storing h(R,G,B). In the initialization step, the fourth most significant bit x of $h_S$(R,G,B) is set to 1 in the LUT to indicate an entry has not been used. When h(R,G,B) is computed for any RGB value, bit $h_4$ is automatically set to 0, thereby indicating that the entry in the LUT has been used. Thus, h(R,G,B) cannot match an unused entry.

The present invention then compares $h_S$(R,G,B), the byte stored in the LUT entry referenced by f(R,G,B), with the encoded RGB value h(R,G,B) representing the input RGB value. The present invention simultaneously performs two tests in one operation. When the entry has not been used previously, the flag bit x of the stored value $h_S$(R,G,B) is 1, and thus a match cannot occur. This test determines if the entry referenced by f(R,G,B) for the current RGB value contains a calculated CMYK value. Also, it compares the present encoded RGB value h(R,G,B) with $h_S$(R,G,B) to determine if there is an encoded RGB value stored in $h_S$(R,G,B) that is the same as the present encoded RGB value h(R,G,B). This is indicated by the fourth most significant bit being equal to 0.

When a match occurs, the stored CMYK value is output instead of calculating a CMYK value for the input RGB value. Thus, the time consuming calculating step is omitted. When the entry has not been used (the flag x=1) or the current RGB value represented by h(R,G,B) does not match the RGB value represented by $h_S$(R,G,B) stored in the LUT entry, a new CMYK value is calculated dependent upon the current RGB value. The calculation of the CMYK value is done by conventional means, such as the multidimensional lookup table followed by interpolation method. The calculated CMYK is provided as output. The LUT entry is overwritten with the current RGB value represented by h(R,G,B) (see Table 1) and the newly calculated CMYK value. The entry flag x is set to 0 indicating that the entry has been used. This method of adaptively updating LUT entries takes advantage of the locality in RGB space of the pixels in the source image. Thus, the LUT adjusts itself dynamically to satisfy the requirements of the source image. This ensures that the last processed pixel of the source image is stored in the table so that run lengths of the same pixel are processed quickly.

Conversion from Non-RGB Appearance Variables

The present invention is equally applicable when the input image is in other color spaces such as but not restricted to HSB, CIELAB, CIELUV, CIEXYZ and xyz. As should be apparent to a person skilled in the art, the embodiments of the invention are identical to those above for RGB to CMYK conversion, except that the hashing function, f(R,G,B) in the above embodiments, is replaced by other hashing functions, denoted in general by f(color space coordinates), of the respective appearance variables of the input image. The other hashing functions for the CIELAB and CMY color spaces are now specified.

For the CIELAB color space defined by variables L*, a*, and b*, the human eye is more sensitive to changes in luminance L than in variables a* and b*. If a CIELAB value uses 24 bits with 8 bits for each of L*, a*, and b*, the preferred embodiment of the invention for CIELAB color space input uses the hashing function $$f(L^*, a^*, b^*)=(a^* <<(N-8)\oplus(b^*<<(n-7)/2)\oplus L^{*\prime}, \quad (11)$$

where L*′ is L* with the bit order reversed.

For the CMY color space defined by subtractive primaries C, M, and Y, the human eye is more sensitive to changes in yellow Y then in cyan C and magenta M. If a CMY value uses 24 bits with 8 bits for each of C, M, and Y, the preferred embodiment of the invention for CIELAB color space input uses the hashing function $$f(C,M,Y)=(C<<(N-8)\oplus(M<<(n-7)/2)\oplus Y' \quad (12)$$

Other details of the present invention should be apparent to a person skilled in the art using the details provided for the preferred embodiment for conversion from RGB to CMYK. Furthermore, this invention is applicable to conversion from appearance variables to colorants, and from appearance variables to other appearance variables.

Conversion from Colorants

The present invention is further applicable to cases where the source image is in colorants, for example, for pre-separated images that need to be converted to appearance variables for further editing or other purposes. It is also is applicable to cases where the source image is in colorants that need to be converted to alternate colorants as in the case when color separations for one printer are available and need to be converted to new separations for a different printer or for the same printer with different inks.

For conversion from CMYK to RGB, the hashing scheme used in the preferred embodiment of the present invention does not hash black K, and forms a hashing function f(C,M,Y) defined by $$f(C,M,Y)=(M'<<(N-8)\oplus(C'<<(N-7)/2)\oplus Y') \quad (13)$$

The first part of each entry in the lookup table now consists of both K and $h_S(C,M,Y)$ calculated analogously to Equation (2), with magenta M rather than blue B, C rather than R, and Y rather than G. For the case of P=24 bits, two bytes are used for this part of each LUT entry rather than one byte as in the case when the source image is in RGB and P=24. In the CMYK input case, $h_S(C,M,Y)$ and $h_S(C,M,Y)$ must match when the flag bit is 0, and the black K parts needs to match.

Other Image Processing Functions

The present invention is equally applicable to performing image processing functions other than color conversions. It is applicable to all cases where a non-trivial calculation is applied to the image on a pixel-by-pixel basis. That is, the calculation of a result for a particular pixel location is dependent only on the source pixel at that location in the image. Such processing is known as point processing in the art to distinguish it from image processing. In image processing, the result for a particular pixel location is dependent on one or more pixels at a different location in the image. The present invention has equal applicability with any value associated with a source pixel including, but not limited to, appearance values, colorants, density values, contrast, etc. Conversion or transformation of a source pixel value proceeds directly according to the method and apparatus for color conversion. The part of the main LUT that keeps the conversion results, in the case of the invention used for color conversion, is used to store the results of the particular point processing. The amount of storage allocated at each entry for the results part is dependent on the particular point function. Thus, it should be apparent to a person skilled in the art that the present invention can be utilized for performing any point processing.

Block Diagram of the Present Invention

Further details of the present invention are described below for RGB to CMYK conversion. Other embodiments of the present invention follow in a similar way from the given details.

Figure 4:
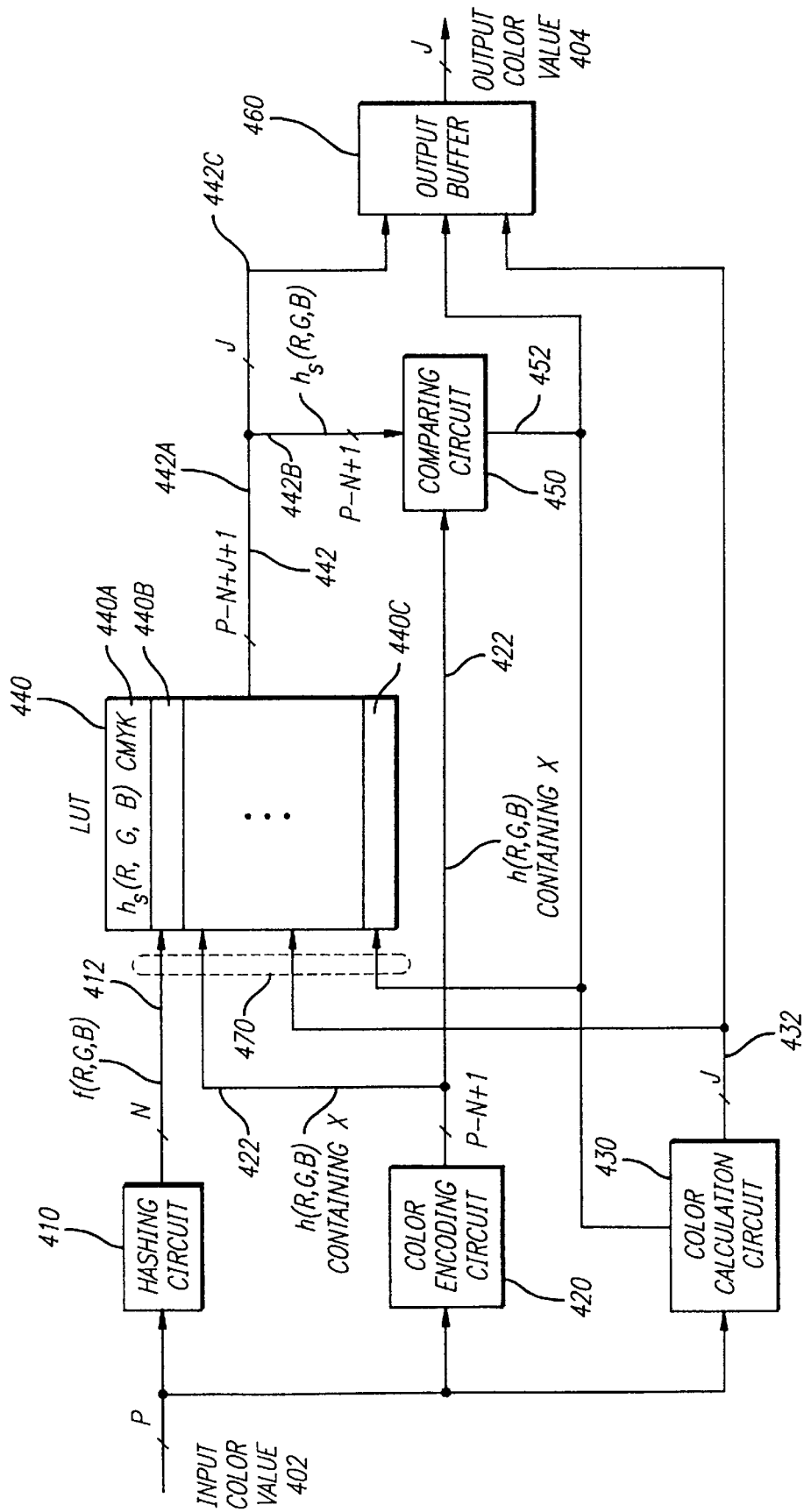
FIG. 4 is a diagram illustrating the present invention.

FIG. 4 is a diagram illustrating the present invention for computing color transformations comprising hashing circuit 410, color encoding circuit 420, color calculation circuit 430, main LUT 440, comparing circuit 450, and output buffer 460. Color encoding circuit 420 may be alternately function as appearance value encoding circuit 420 and colorant encoding circuit 420 in alternate embodiments of the present invention. Similarly, color calculation circuit 430 may be alternately function as appearance value calculation circuit 430 and colorant calculation circuit 430 in alternate embodiments of the present invention. An input color value (e.g., RGB value) comprising P bits is provided to hashing circuit 410, color encoding circuit 420, and output color (e.g., CMYK) calculation circuit 430. The output of hashing circuit 410 is coupled to main LUT 440 for addressing the LUT 440. The output 422 of color encoding circuit 420 is coupled to LUT 440 and to comparing circuit 450 for providing h(R,G,B) which contains flag x. Color calculation circuit 430 for computing output color values 404 is coupled to LUT 440 and output buffer 460. The output 432 of color calculation circuit 430 that provides a J bit (e.g., 32 bits for CMYK) output color value is coupled to the LUT 440 and the output buffer 460. Thus, the data inputs 470 of LUT table 440 comprise N-bit hash value f(R,G,B), P-N encoded color value h(R,G,B), a 1 bit status flag x, and J bit output color value 432 from color calculation circuit 430.

Each entry 440A–440C of LUT table 440 can store P-N+J+1 bits. The output 442 of LUT 440 comprises P-N+J+1 bits. The P-N+1 bit $h_S(R,G,B)$ value comprising the status flag x embedded with encoded color value h(R,G,B) is provided to comparing circuit 450. Comparing circuit 450 compares the P-N+1 bit $h_S(R,G,B)$ value stored in the LUT 440 with the output 422 of color encoding circuit 420 that provides status flag x embedded with encoded color value as h(R,G,B) for the current input color value 402. The $h_S(R,G,B)$ value is referenced by f(R,G,B) for the input color value 402. The output 442 of LUT 440 is also coupled to output buffer 460 for providing a J bit output color value 442C (e.g., the stored CMYK value). The output 452 of comparing circuit 450 is coupled to output buffer 460, color calculation circuit 430, and LUT 440. Output buffer 460 provides J bit output color value 404.

An input color value 402 is provided to hashing circuit 410 and color encoding circuit 420. In response to the input color value 402, hashing circuit 410 generates an N bit hash value f(R,G,B) for addressing an entry of 2N entries 440A–440C of LUT. The address f(R,G,B) generated is dependent upon the response characteristics of the human eye. Similarly, color encoding circuit 420 produces an encoded color value h(R,G,B) which contains status flag x. The encoded color value h(R,G,B) containing status flag x are provided as a byte to comparing circuit 450. Comparing circuit 450 compares the encoded color value h(R,G,B) and status flag x (output 422) with the P-N+1 bit $h_S(R,G,B)$ value 442B stored in the entry of LUT 440 referenced by the hash value f(R,G,B).

When comparing circuit 450 determines a match, the output 452 of comparing circuit 450 (logic level HIGH) causes output buffer 460 to provide the J bit color value 442C from the LUT 440 as output color value 404. When comparing circuit 450 determines that a match did not occur, the output 452 of comparing circuit 450 (logic level LOW) initiates computation of an output color value by color calculation circuit 430 using the input color value 402. The logic level LOW output provided by comparing circuit 452 causes LUT 440 to store the output color value (CMYK) 432 of color calculation circuit 430. This also causes output buffer 460 to select the output color value (CMYK) 432 of color calculation circuit 430, and provide it as output color value 404.

Hashing Circuit of Present Invention

Figure 5:
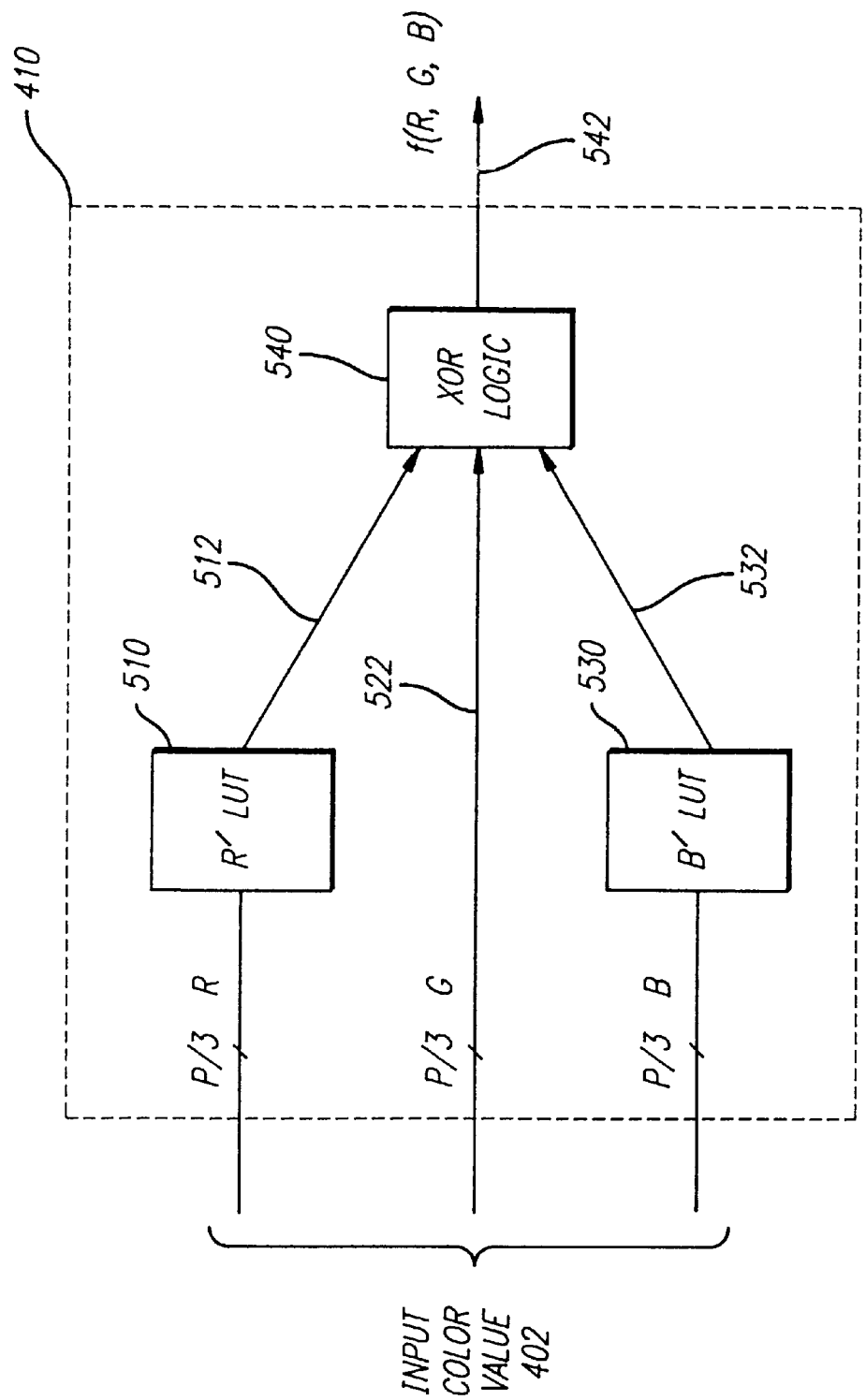
FIG. 5 is a diagram illustrating the hashing circuit for transforming a color value into a LUT index.

FIG. 5 is a diagram illustrating the hashing circuit 410 of FIG. 4. Input color value 402 is provided to hashing circuit 410. The R and B components, each comprising P/3 bits, are provided to R' LUT 510 and G' LUT 530, respectively. In FIG. 5, a LUT table is not utilized for the B component. However, it should be apparent to a person skilled in the art that the present invention can be implemented with such a LUT according to the hashing function employed. As described above in Equation (1), the bit order of components B and R are reversed, and are shifted left by (N–8) and (N–7)/2, respectively. These values are stored in B' LUT 530 and R' LUT 510, respectively, where each LUT 510 and 530 comprises $2^{P/3}$ entries. This significantly reduces the time required for processing an input color value 402 to produce a hashing value f(R,G,B) provided at the output of hashing circuit 410. In another embodiment of the present invention, the G LUT may contain $2^{P/3}$ entries for the blue color component.

The outputs 512 and 532 of R' and B' LUTs 510 and 530 are coupled to XOR logic 540. The G component of 522 of input color value 402 is coupled to XOR logic 540. The XOR logic 540 exclusive-ORs the G component and the shifted B' and R' components as illustrated in Equation (1). The output 542 of XOR logic 540 provides hashing value f(R,G,B) to address LUT 440 of FIG. 4. Operation of the present invention is described further with reference to FIGS. 1–3 below.

Detailed Flow Diagram of the Present Invention

FIG. 1 is a flow diagram illustrating the present invention for computing color transformations of source images. Processing begins at step 100. At step 102, the LUTs are allocated and initialized. In order to speed up calculation of the function f(R,G,B) according to Equation 1 and Table 1, lookup tables of the precalculated dependencies of f(R,G,B) in R, G, and B are built. The main LUT is also built in this step 102. In decision block 104, a check is made to determine if all the source image data (RGB values) has been processed. When decision block 104 returns true (Yes), processing stops at step 106. Otherwise, execution continues at step 108. In step 108, an RGB value is obtained. In step 110, a hash value f(R,G,B) for referencing the main LUT and an encoded RGB value h(R,G,B) are computed using Equations (1) and (2). In decision block 112, a check is made to determine if the LUT entry referenced by the hash value f(R,G,B) is equal to the encoded RGB value h(R,G,B). When decision block 112 returns true (Yes), a previously computed CMYK value is obtained from the LUT entry, and provided as output in step 114. Execution continues at decision block 104. When decision block 112 returns false (No), a CMYK value is computed for the RGB value, and provided as output in step 116. In step 118, the status flag, encoded RGB value h(R,G,B), and the CMYK value are stored in the main LUT entry referenced by hash value f(R,G,B). Execution continues at decision block 104.

Allocation of Lookup Tables

Figure 2:
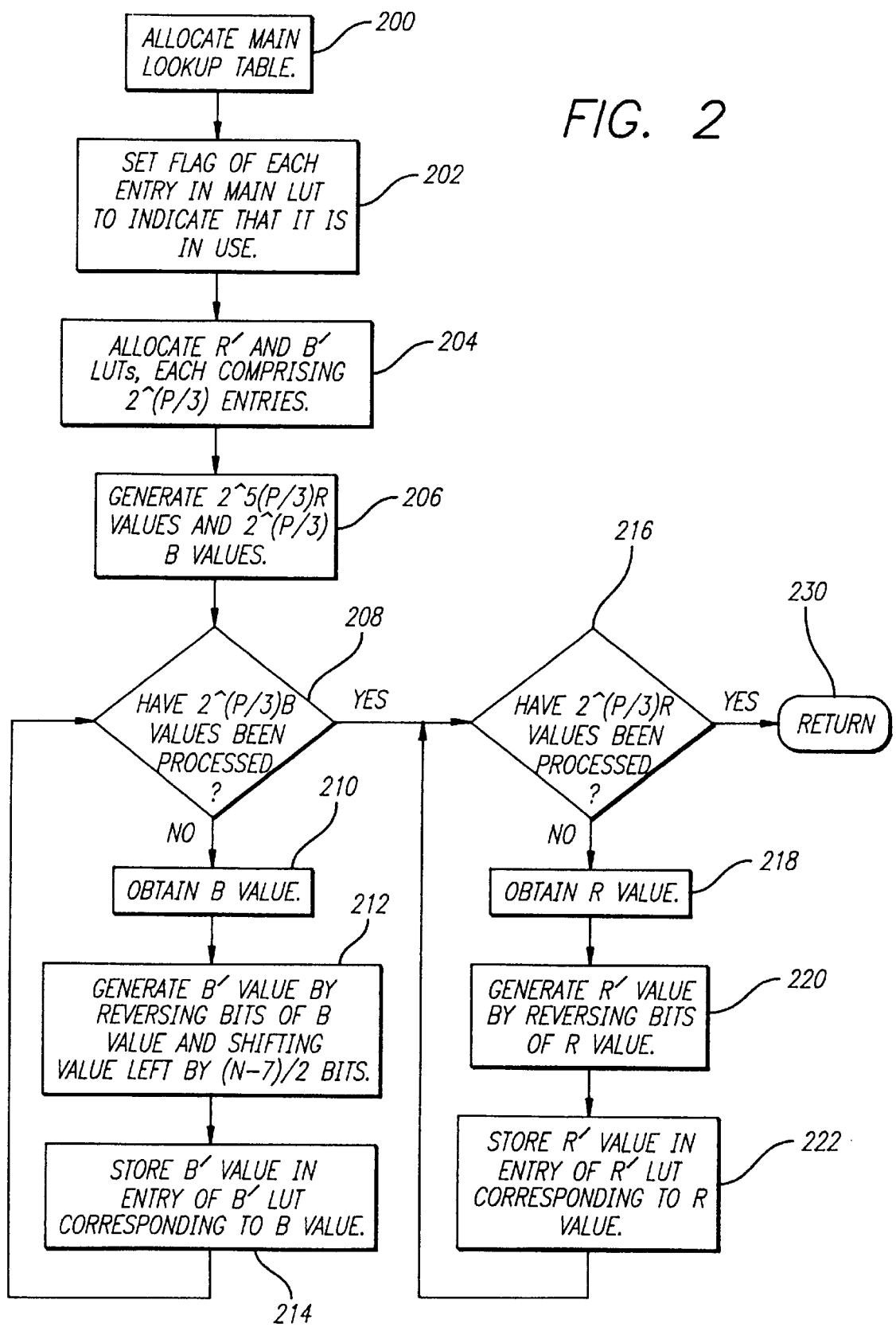
FIG. 2 is a flow diagram illustrating step 102 of FIG. 1.

FIG. 2 is a flow diagram illustrating step 102 of FIG. 1 for allocating R', B', and the main lookup tables. A component G dependency lookup table is not required in the preferred embodiment. However, the present invention may be practiced with such a lookup table. In step 200, the main LUT is allocated in memory. In step 202, the flag byte x of each entry in the main LUT is set to indicate that the entry is used. In step 204, the R' and B' LUTs are allocated in memory. Because each color component R, G, and B, is represented by P/3 bits (e.g., 8 bits), each R' and B' LUT comprises $2^{P/3}$ (e.g., 256) entries. The LUTs have a one-to-one correspondence between entries of the LUTs for storing transformed components R' and B' and input color components R, G, and B. Thus, the R and B components of an RGB value reference entries in each corresponding LUT. In step 206, $2^{P/3}$R and $2^{P/3}$B component values are generated.

In decision block 208, a check is made to determine if all of the $2^{P/3}$B component values have been processed. When decision block 208 returns true (Yes), execution continues at decision block 216. When decision block 208 returns false (No), execution continues at step 210. In step 210, an B component value that has not been previously processed is obtained. In step 212, a transformed component value B' is generated. The value B' is produced by first reversing the order of the bits (e.g., $R_7$(old)→$R_0$(new) and $R_0$(old)→$R_7$ (new), and so on) of the component value B, and then shifting the intermediate value left by (N–8) bits (e.g., 9 bits for N=17). Thus, transformed component B' is a 17 bit value. In step 214, the transformed component B' is stored in an entry of the B' LUT that is referenced by P/3 bit color component B. Execution continues at decision block 208.

In decision block 216, a check is made to determine if all of the $2^{P/3}$R component values have been processed. When decision block 216 returns true (Yes), execution returns at step 230. When decision block 216 returns false (No), execution continues at step 218. In step 218, a R component value that has not been previously processed is obtained. In step 220, a transformed component value R' is generated. The value R' is produced by reversing (described above) the order of the bits of the component value R. The reversed R value is then shifted left by (N–7)/2 bits (e.g., 5 bits for N=17). In step 222, the transformed component R' is stored in an entry of the R' LUT that is referenced by P/3 bit color component R. Execution continues at decision block 216.

As stated above, in the preferred embodiment for RGB to CMYK conversion, G is used in generating f(R,G,B) without any bit reversal or shifts, so no lookup table is needed to speed us calculation of the G dependency in f(R,G,B).

Computation of Hash Value and Encoded Color Value

Figure 3:
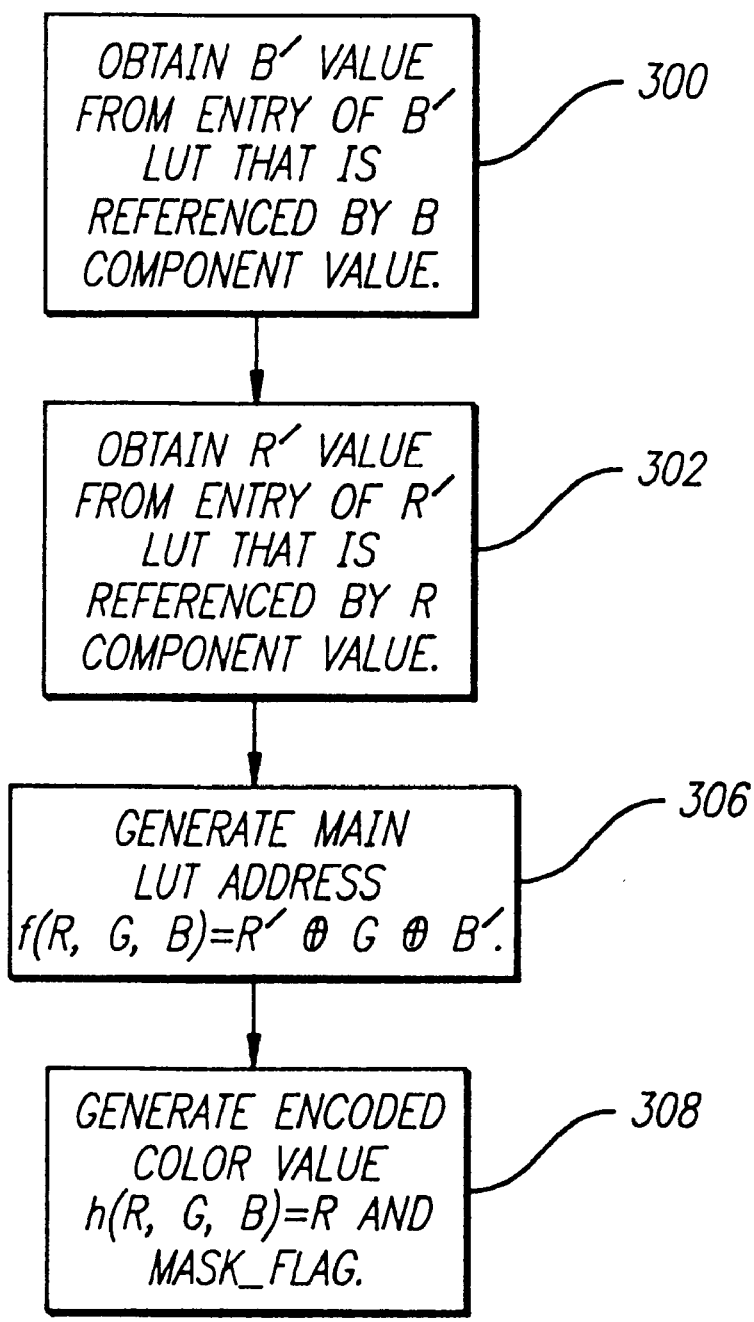
FIG. 3 is a flow diagram illustrating step 112 of FIG. 1.

FIG. 3 is a flow diagram illustrating step 112 of FIG. 1 for calculating a hash value f(R,G,B) and an encoded color value h(R,G,B). In step 300, a transformed value B' is obtained from an entry of B' LUT that is referenced by the current B color component. In step 302, a transformed value R' is obtained from an entry of R' LUT that is referenced by the current R color component.

In step 306, a hash value h(R,G,B) is computed by exclusive-ORing transformed values B' and R' together with G according to Equation 1 defining h(R,G,B) fro the preferred embodiment for RGB to CMYK conversion.

Thus, the present invention recites a method for generating hash values, or addresses, having the property that small changes in the input color represented by RGB, as determined by certain properties of the human visual system, produces a large dispersal in hash values. In step 308, the encoded color value h(R,G,B) is computed according to Equations (2) and (3), and as further illustrated in Table 1. Thus, seven bits of h(R,G,B) contain the upper 3 and lower 4 bits of R that are thrown away when generating the hash value f(R,G,B) in step 306 using the exclusive-OR operation. The h(R,G,B) value is stored in a single byte containing 8 bits in the main LUT in step 120 of FIG. 1. The fourth most significant bit of this byte is used to store the user flag x.

Alternate Fmbodiment for RGB to CMYK Conversion

FIG. 4 illustrates a LUT 440comprising N entries 440A–440C. Each entry 440A–440C is illustrated as a single entry comprising P-N+J+1 bits (as described above) for storing a status flag, encoded input color, and output color value. The present invention is not limited to a simple LUT having single value entries, and other structures for storing data may be utilized without departing from the scope of the present invention. For example, each entry 440A–440C of LUT 440 may comprise a linked list of size L. This allows Lip to L previously computed output color values (CMYK) to be dynamically retained. Thus, the present invention stores up to L previously computed output color values for input color values that map to an entry. This increases the likelihood that an already computed output color value is found in storage when processing a source image. This correspondingly reduces the amount of time required to process the source image.

The present invention reduces the amount of time required to compute color transformations from a first color space to a second color space. This is accomplished by storing previously computed output color values in memory including an encoded first color value. The use of the encoded color value ensures full precision when comparing a current first color value with a stored color value. The hashing block generates widely dispersed indexes into the lookup table to reduce the number of collisions when small changes in first color values occur. Further, the hashing block generates indexes dependent upon the response characteristics of the human eye. The present invention requires less memory than other prior art methods while reducing the number of comparisons that are required to determine a previously computed second color value.

In this manner, a method and apparatus for computing color transformations of source images is disclosed.

We claim:

1. An apparatus for performing point processing to transform a source image to an output image comprising:

first lookup table comprising a plurality of entries:

hashing means coupled to said lookup table for producing an index dependent on a first point value, said index for referencing an entry of said plurality of entries in said lookup table;

encoding means coupled to said lookup table for generating an encoded point value dependent on said first point value;

comparing means coupled to said lookup table and said encoding means for comparing said entry of said lookup table and said encoded point value to determine a match;

calculation means coupled to said lookup table for generating said second point value dependent on said first point value, said calculation means generating said second point value when a match does not occur, said lookup table outputting said second point value when a match occurs;

means for reducing collisions in said lookup table between first point values having values that change slowly; and wherein said source image is RGB color, and wherein the bit order of the blue and red (the "B" and "R") components are reversed, such that in the lower order bits are more significant than the higher order bits in which the reversed components are optionally shifted, wherein small changes in the green (the "G") component are given greater significance than the R component, and wherein changes in the R component are given more weight than the B component.

2. An apparatus for transforming a source image to an output image comprising:

a first lookup table comprising a plurality of entries;

means for mapping source image values into lookup table addresses so that source image values that are close to each other are mapped to addresses in the lookup table that are far apart;

wherein collisions in the lookup table between picture elements in the source image having color values that change slowly are reduced; and wherein said source image is RGB color, and wherein the bit order of the blue and red (the "B" and "R") components are reversed, such that in the lower order bits are more significant than the higher order bits in which the reversed components are optionally shifted, wherein small changes in the green (the "G") component are given greater significance than the R component, and wherein changes in the R component are given more weight than the B component.

3. An apparatus for transforming a source image to an output image, comprising:

a first lookup table comprising a plurality of entries;

a hashing circuit for generating indexes into said lookup table referencing widely-separated entries of said first lookup table for source image picture elements having similar first colors; and wherein said source image is RGB color, and wherein the bit order of the blue and red (the "B" and "R") components are reversed, such that in the lower order bits are more significant than the higher order bits in which the reversed components are optionally shifted, wherein small changes in the green (the "G") component are given greater significance than the R component, and wherein changes in the R component are given more weight than the B component.

4. The apparatus of claim 3 wherein said hashing circuit comprises:

a plurality of lookup tables for storing transformed color components of a first plurality of color components, respectively, of a first color of a source image picture element; and a logic circuit coupled to said plurality of lookup tables for generating an index using said transformed color components.

5. A method for transforming a source image to an output image, comprising the steps of:

generating an encoded color based upon a first color of a source image picture element;

comparing an entry of a lookup table and said encoded color to determine a match;

generating a second color for an output image picture element when a match does not occur, said lookup table outputting said color when a match occurs;

wherein said source image is RGB color, and wherein the bit order of the blue and red ( the "B" and "f") components are reversed, such that in the lower order bits are more significant than the higher order bits in which the reversed components are optionally shifted, wherein small changes in the green (the "G") component are given greater significance than the he component, and wherein changes in the R component are given more weight than the B component; and wherein said lookup table is updated with said second color when a match does not occur.

6. The method of claim 5 further comprising the steps of:

generating an index for referencing an entry of said lookup table.

7. The method of claim 5 further comprising the step of:

generating indexes referencing widely-separated entries of said lookup table for source image picture elements having similar colors.

8. An apparatus for transforming a source image to an output image, comprising:

a lookup table comprising a plurality of entries, each of said plurality of entries representing a color;

means for comparing an entry in said lookup table to a source image picture element to determine a match therebetween;

means for providing a second color of an output image picture element corresponding to said source image picture element when a match occurs, and for generating a second color for said source image picture element when a match does not occur;

means for writing into said lookup table said second color that results when a match does not occur; and wherein said source image is RGB color, and wherein the bit order of the blue and red (the "B" and "R") components are reversed, such that in the lower order bits are more significant than the higher order bits in which the reversed components are optionally shifted, wherein small changes in the green (the "G") component are given greater significance than the R component, and wherein changes in the R component are given more weight than the B component.

* * * * *